March 17, 1959 H. W. HEINE 2,877,531
METHOD AND MACHINE FOR MOLDING DELICATE MATERIALS
Filed Sept. 23, 1954 4 Sheets-Sheet 1
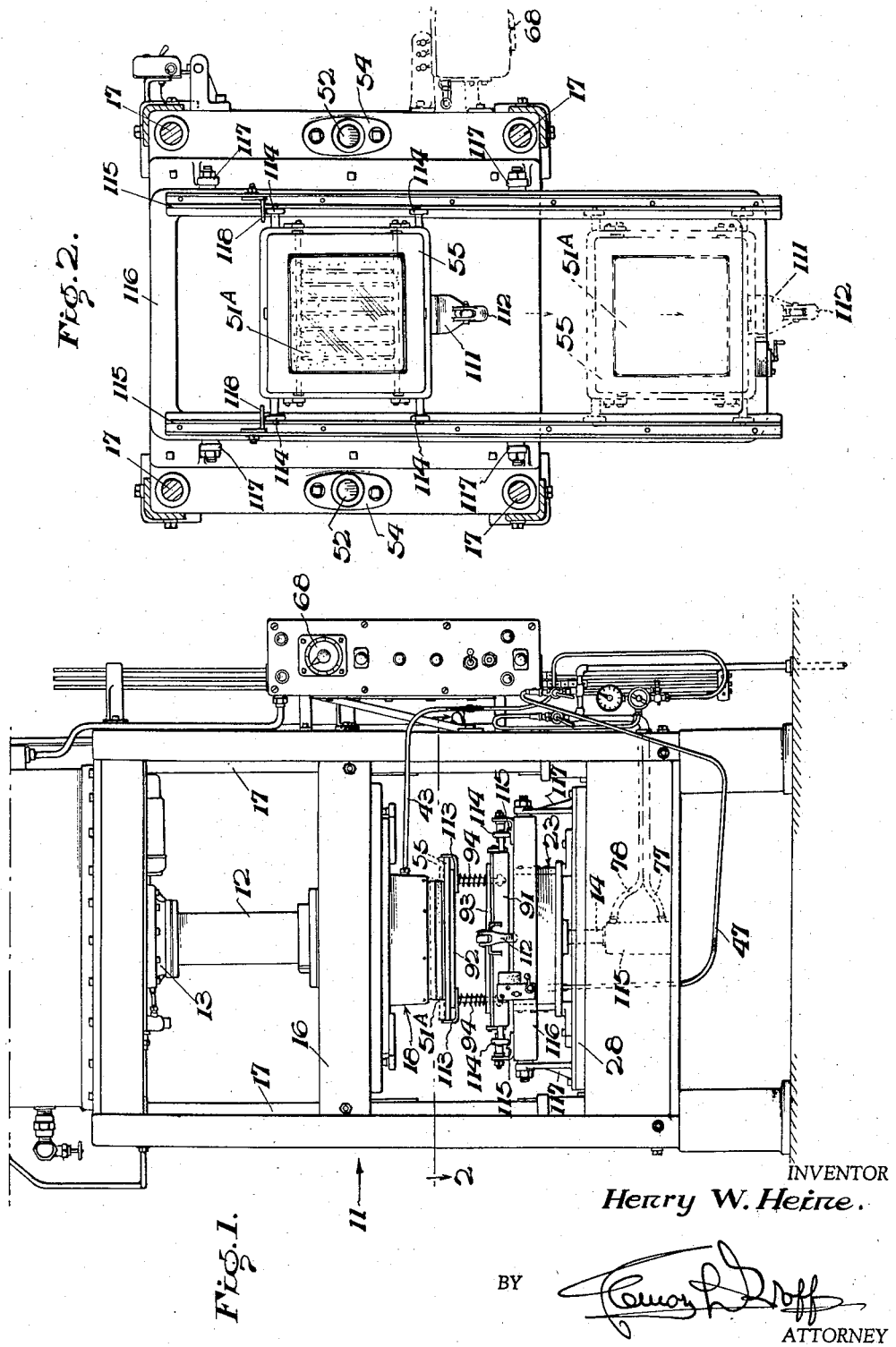
INVENTOR
Henry W. Heine.
BY
ATTORNEY March 17, 1959 H. W. HEINE 2,877,531
METHOD AND MACHINE FOR MOLDING DELICATE MATERIALS
Filed Sept. 23, 1954 4 Sheets-Sheet 2
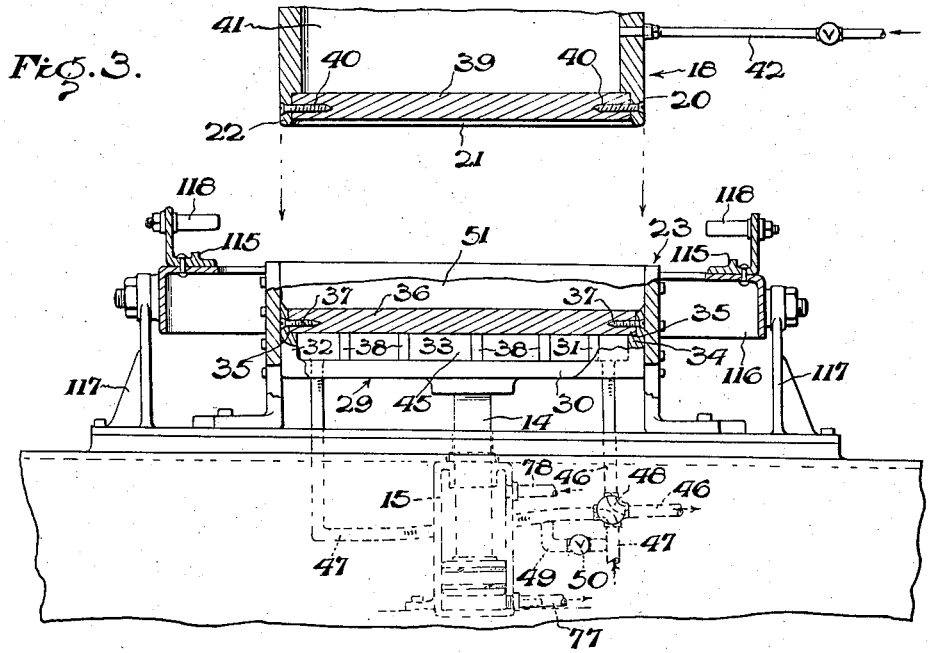
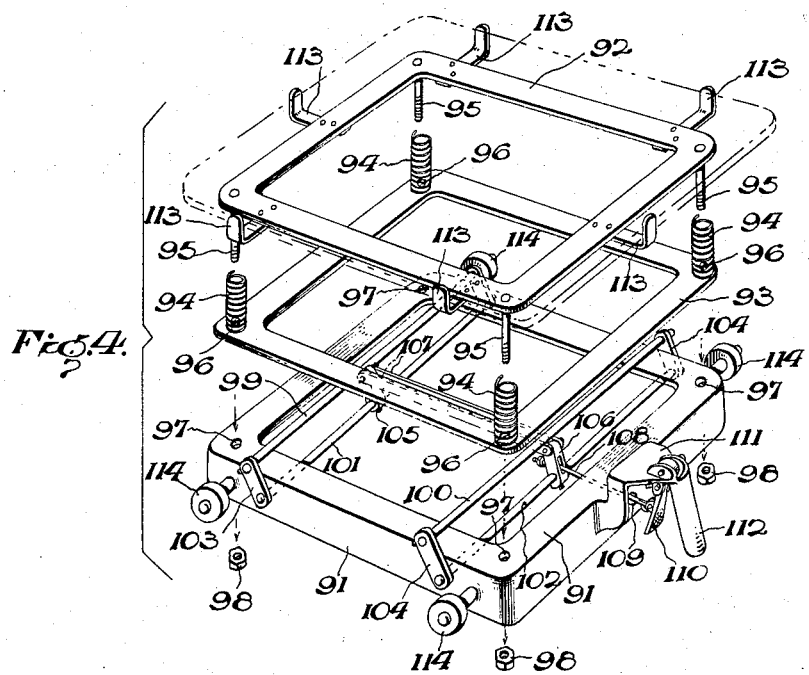
INVENTOR
Henry W. Heine.
BY 
ATTORNEY

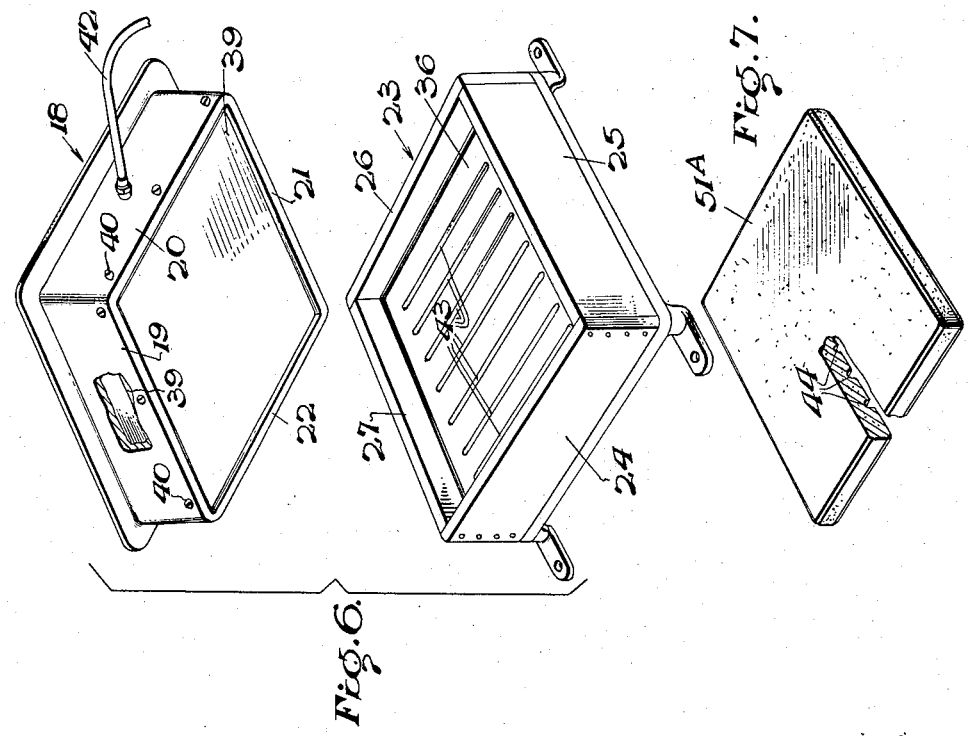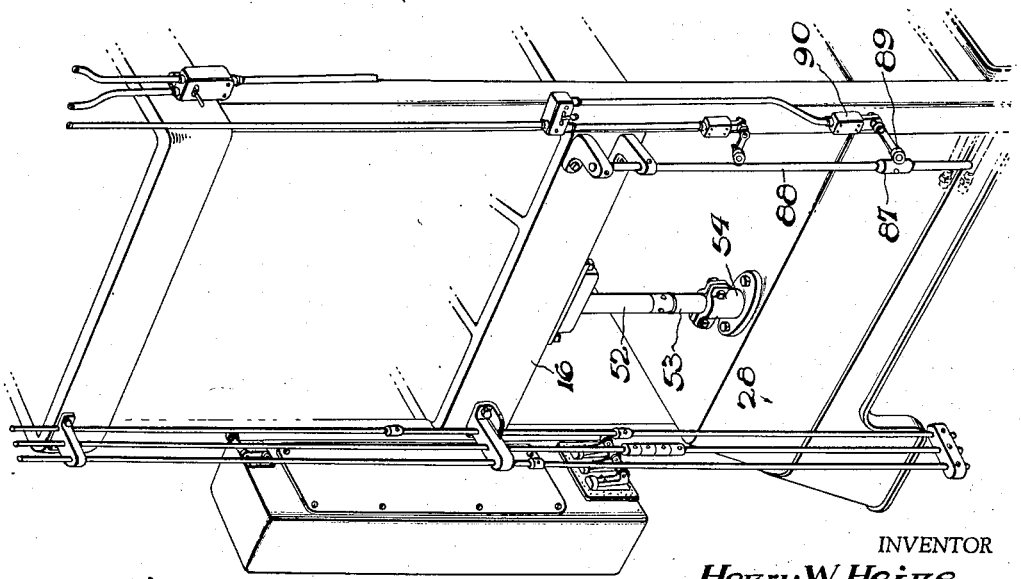

United States Patent Office 2,877,531
Patented Mar. 17, 1959

2,877,531

METHOD AND MACHINE FOR MOLDING DELICATE MATERIALS

Henry William Heine, Washington, D. C.

Application September 23, 1954, Serial No. 457,833

8 Claims. (Cl. 25—45)

This invention relates to molding devices and is more particularly concerned with machines for molding relatively soft and frangible materials that are easily deformed.

A specific application of the present invention is in the field of ceramics, although the invention is by no means limited thereto. In the ceramic art, it is sometimes desired to use a ceramic composition having a high moisture content in the manufacture of various products, such as special bricks, tile, acoustical blocks, etc. Ceramic mixtures having such a high moisture content are difficult to mold and to handle after molding for the purpose of transferring them to a kiln or other apparatus for further processing. Ordinary pug mills are not satisfactory, if at all feasible, and the general object of the invention is to provide a molding machine for such materials and others having similar physical properties and requiring similar delicate handling.

A still further object of the invention is the provision of means for removing and conveying from the machine the pieces after they are molded in such a manner as to prevent their distortion, such, for example, where they are transferred to a kiln or other apparatus for further processing.

In general, the method of the invention comprises the application of a machine having a pair of cooperating die elements, each carried by reciprocating members. The material to be formed is placed between the die elements and the reciprocating members are caused to come together so as to form the material therebetween. The formed piece is held between the die elements and both members are actuated simultaneously in one direction to elevate the dies above an unloading station. Means are provided to then release the lower die from the formed piece and to move it downward to its initial position, leaving the formed piece adhering to the upper die from which it is released and transferred to a pallet.

The invention will be more fully understood from the following description considered together with the accompanying drawing, and further objects and advantages thereof will be apparent.

Figure 1 is a front elevational view of an embodiment of the invention in one position of operation.

Figure 2 is a section along the line 2—2 of Figure 1.

Figure 3 is a cross-sectional view through a portion of the embodiment showing on an enlarged scale the relative position of the die members immediately prior to the molding operation.

Figure 4 is an exploded perspective view of the unloading carriage.

Figure 5 is a perspective view of a portion of the embodiment showing the location of certain control elements.

Figure 6 is a composite perspective view of two principal parts of the die.

Figure 7 is a perspective view of a molded piece removed from the die.

Figure 8:
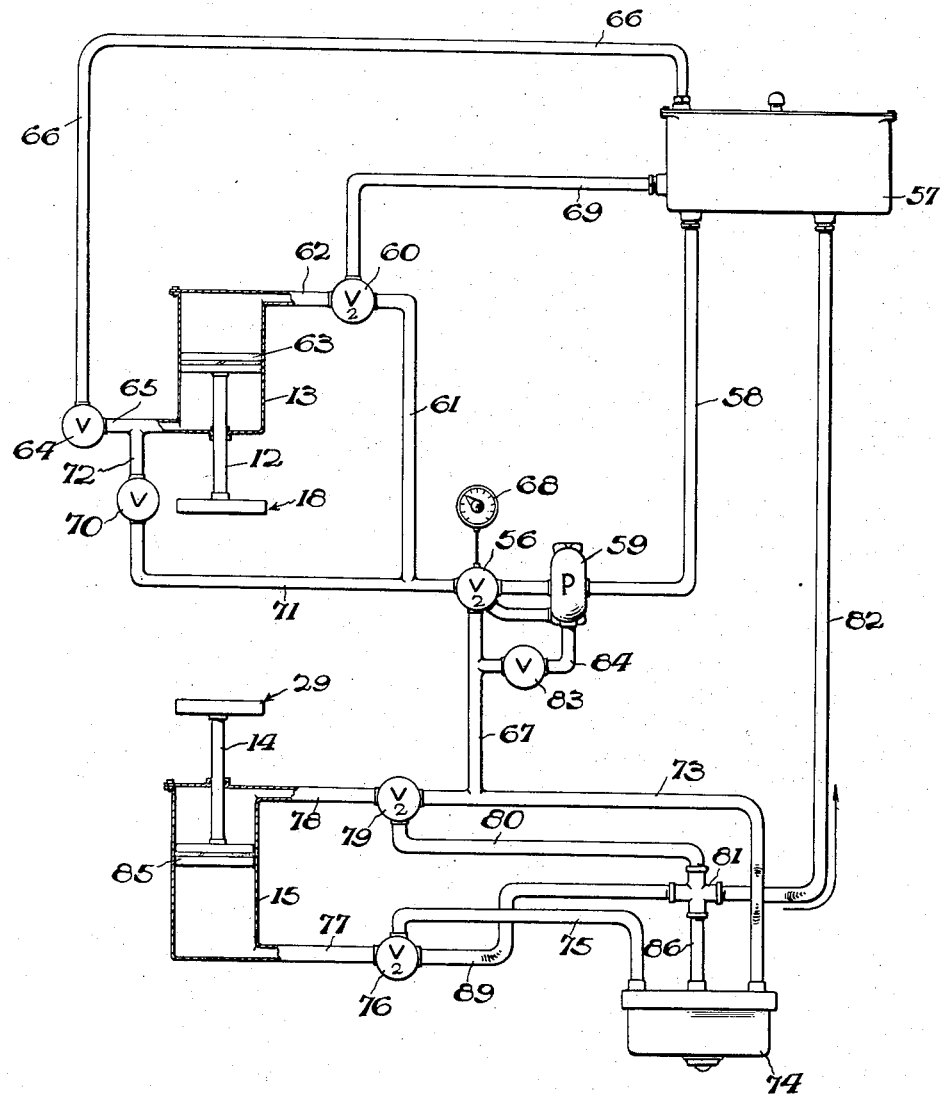
Figure 8 is a schematic diagram of the hydraulic system.

Referring with more particularity to the drawing, in which like numerals designate like parts, the embodiment illustrated comprises a hydraulic press, generally designated by the numeral 11 having an upper hydraulic actuated ram 12 projecting from upper hydraulic cylinder 13 and a lower hydraulic ram 14 projecting from a bottom hydraulic cylinder 15.

The upper ram 12 is connected to a slide block 16 which is slidably mounted on vertical rods 17. To the bottom of the block 16 there is secured the upper section 18 of a specially constructed die, having side walls 19, 20, 21 and 22, and which is described more fully hereinafter.

The lower section of the die comprises a hollow member or shell 23 having side walls 24, 25, 26 and 27 which circumscribe an area corresponding to the cross-sectional area of the exterior walls of the upper section 18. The walls of the shell 23 are secured in fixed position on the press bed 28 and a movable assembly 29 is disposed for vertical movement within the shell 23 and is attached to the ram 14 of the hydraulic cylinder 15.

The assembly 29 comprises a cup-shaped member having bottom plate 30, an open top, and side walls 31, 32, 33 and 34 in slidable contact with the interior of the walls of the shell 23. The walls 31, 32, 33 and 34 are rabbeted at the top to provide on the inner sides upwardly facing shoulders 35, respectively, which support a platen 36 constituting the bottom of the die. The platen 36 is a high strength, porous material, pervious to gas and liquid and impervious to the solid material to be molded in the die, a preferred material being silica carbide, particles bonded together in the form of a slab with a vitrified ceramic material, such as ball clay, feldspar, silica, etc., commercially sold under the name "Carborundum." Another preferred material is aluminum oxide particles, similarly formed and bonded, commercially sold under the name of "Aloxite." Still another material is sintered metal. It is held in place by means of countersunk screws 37 projecting inwardly from the walls 31, 32, 33 and 34. Between the bottom plate 30 and platen 36 support posts or stanchions 38 are set to support the platen 36.

Within the walls of the upper section 18 of the die there is recessed from the bottom a porous permeable platen 39 similar to the platen 36. The platen 39 is secured to the walls with screws 40 and is positioned below the upper end to provide a space or plenum chamber 41. This chamber is connected to an air or other fluid pressure line 42 passing through one of the walls, say wall 20, as shown.

The bottom surface of the platen 39 and the upper surface of the platen 36 may be provided with configurations to impart any design characteristics desired for the piece to be molded. For example, ridges 43 are shown in the platen 36 which will form corresponding grooves or channels 44 on one side of the molded piece and which may be desired in connection with the manufacture of acoustical tile as a backing surface.

The space 45 between the plate 30 and platen 36 is a plenum chamber and it is connected to a flexible section line 46 and a flexible air or other fluid pressure line 47 through a double valve 48. In one position of this valve both lines 46 and 47 are closed to the chamber 45, and in the other position both lines are open. The latter position is used to discharge water which drains through the platen 36 and which accumulates from time to time in the chamber 45. The valve 48 is by-passed by a line 49 having a valve 50 whereby the fluid pressure line can be communicated to the chamber 45 to the exclusion of the suction line for purposes hereinafter more fully explained.

The plastic material 51 to be molded is placed in the lower section, as shown in Figure 3, with the two sections of the die separated. The upper hydraulic ram 12 is then actuated down, whereupon the lower part of the upper section of the die enters the lower die section and causes the material to flow under the resulting pressure to conform to the inner surfaces of the die. Any excess fluids in the material is forced into the interstices of the porous platens 36 and 39. The lowermost position of the upper section of the die is determined by a gauge post 52 secured to and projecting downwardly from the slide block 16, contacting an abutment post 53 projecting upwardly from the press bed 28. The post is threadedly engaged with a boss 54 on the press bed, whereby the height of its upper end may be adjusted to vary the lowermost position of the upper section in accordance with the size of the pieces to be molded.

When the upper section is in its lowermost position, it is permitted to set or dwell for a period sufficient to insure a proper distribution of the plastic material in the die. The dwell period may be only a few seconds or a fraction of a second, but in any case will depend upon the consistency of the material being molded.

At the conclusion of the dwell period both hydraulic rams are actuated upwardly in absolute unison. This actuation is made slow at first until the upper edge of the platen 36 passes out of the shell 23 so as to avoid or minimize edge section that might deform the edge of the molded piece moving along the inner surfaces of the shell walls. However, after the molded piece clears the shell 23, the speed of the upper ram is increased and that of the lower ram is decreased and reversed to bring it to its initial position. At the same time, the by-pass valve 50 is opened which forces fluid through the pores of the platen 36. The fluid breaks the adhesion or surface tension between the platen 36 and the bottom of the molded piece, thus permitting the platen to drop free of the molded piece.

The upper position of the platen 39 is determined as a matter of convenience for removing the molded piece 51A which is held on the platen by adhesion and can be separated by injecting fluid from line 42 into the plenum chamber 41 which will pass through the pores of the platen. The molded piece is caught on a pallet 55 which is placed lightly against the bottom of the molded piece and gently lowered as the fluid pressure is applied. The pallet with the molded piece is then carried away for further treatment, such as by firing in a kiln, and the cycle of operation is repeated.

Although the operation of the machine as described above may be manually controlled, it is preferred to include certain features to provide for a better function of the machine.

One of these features is in connection with actuation of the rams and the hydraulic arrangement as illustrated schematically in Figure 8. In the beginning of the cycle a three-way calibrated variable pressure and unloading valve 56 is open and hydraulic fluid from the tank 57 through pipe line 58 is forced through it by a constant pressure pump 59. A three-way valve 60, which controls the passage of fluid at the top of the upper hydraulic cylinder 13, is open for the passage of fluid under pressure from the valve 56 through pipe lines 61 and 62 into the top of the cylinder 13 to exert a downward force on the piston 63. Exhaust valve 64 connected by a pipe 65 to the lower side of the cylinder is open to permit the return of fluid to the tank 57 through the pipe line 66. The fluid associated with the lower hydraulic cylinder 15 is held inactive during this period by adjustment of the valve 56 to close the passage of fluid therefrom into the pressure line 67 leading to the hydraulic system of the lower cylinder.

The valve 56 is electrically operated and is provided with a time switch 68 which functions to hold it closed during that part of the cycle which requires the ram of the upper cylinder to dwell or remain at rest at the end of its down stroke for a sufficient period to permit the material being molded to assume the shape of the die.

At the end of this dwell period, the valve 56 is actuated to open the line 67 to the fluid under pressure and fluid then flows into the systems of both the upper and lower cylinders simultaneously. In the upper system the position of the valve 60 is changed to close the line 61 to the line 62 and to open line 62 to a return line 69 leading from the valve to the tank 57. Also, the valve 64 is closed and a valve 70 is opened to feed fluid from the valve 56 through pipes 71 and 72 into the lower end of the cylinder 13. These valves are all electrically operated.

In the lower hydraulic system, fluid is being forced through the lines 67 and 73 at one side of a special pressure control valve 74, hereinafter more fully explained, thence from the other side of the control valve through lines 75, three-way electrically control valve 76 and pipe 77 into the bottom of the lower cylinder 15.

Fluid exhausting from the other end of the cylinder 15 passes through line 78, three-way valve 79, line 80, manifold 81 and line 82 into tank 57.

By these means fluid pressure is acted upwardly against both hydraulic pistons and the valve 56 is adjusted to lower pressure so as to move the pistons slowly until the platens 36 and 39 move out of the shell 23. Electrically controlled valves 79 and 76 are then actuated to open the line 78 to line 67 while closing it to line 80, and closing line 77 to line 75 while opening it to line 89 leading to the manifold 81 and return line 82. At the same time, fluid pressure is then applied to platen 36 by opening valve 50 to break its adherence with the molded piece. A valve 83 in a by-pass line 84 is also opened to force fluid from the pump into the line 67. Also, the valve 56 is adjusted to high pressure to accelerate the movement of the ram 12 upwardly until the uppermost position is reached at which time the valve 56 is unloaded. When the two platens come to rest in their respective initial positions, the molded piece is removed from the upper platen and the cycle of operation is completed.

The flow valve 74 is of a special construction. Its function is to coordinate the pressures against the bottom of the two hydraulic pistons 63 and 85 on their up strokes so that they move in absolute unison. The flow valve per se forms no part of the present invention except in combination with the other elements as a differential pressure regulating device. The construction and function of this valve to provide a constant differential pressure between two lines is described in U. S. Patent No. 2,102,865, to which reference is hereby made for a full description thereof. The necessary by-pass for such device (identified by the numeral 26 in said patent) is designated by the numeral 86 herein and is connected to the exhaust manifold 81 as shown.

The electrically operated valves are controlled by a group of limit switches mounted on the frame of the machine as shown in Figure 5. The switches are actuated by cams adjustably attached with set screws to vertical rods. The rods are attached for movement with the reciprocating block 16. In the position shown in Figure 5, the upper hydraulic piston, for example, is in its lowermost position and the cam 87 on rod 88 is against the arm 89 thereby holding the limit switch 90 out of operation for the dwell period and which is controlled by the time switch 68 on the instrument panel (see Figure 1) and to which the switch 90 is electrically connected.

In removing the molded piece 51A from the top platen it is important, particularly where fragile materials (like ceramics) are employed, to prevent undue distortion of the piece while being transferred to the pallet. A device for this purpose comprises a base support member 91 upon which is mounted a resilient support assembly. The latter comprises two frame members 92 and 93, one above the other, separated by a group of coil springs 94. Bolts 95 project downwardly from the top frame member 91 through the coil springs 94 and apertures 96 in the member 93, and apertures 97 in the base support member 91. Nuts 98 are carried on the lower end of the bolts but are disposed a short distance below the bottom of the base member 91 to permit elevation of the frame members 92 and 93 relative to the base member. Between the base member and the bottom of the frame member 93 means are provided for raising the upper assembly a short distance. Although any means may be used, a camming means is illustrated and it comprises a pair of parallel riser bars 99 and 100 between the members 91 and 93. Rocker shafts 101 and 102 are rotatably mounted in the base member 91, one for each riser bar, and connected to its corresponding riser bar by means of shackles 103, 103 and 104, 104. Rocker arms 105 and 106 are attached to the shafts 101 and 102, respectively, and are connected together by a connecting link 107. One of the rocker arms, say 106, is connected to one end of a suitable pull rod 108. The other end of the pull rod passes through an aperture 109 of the base 91 and is linked to a trigger 110. The trigger is pivoted to a bracket 111 to which a handle 112 is also attached.

By pulling on the trigger 110, the rocker shaft is rotated thereby elevating the riser bars 99 and 100 and moving the upper support assembly a short distance.

The upper frame 92 constitutes the pallet rest and is provided with outwardly extending flanged fingers 113 to contact the edges of the pallet and hold it in place.

The entire device is mounted on wheels 114 which rides as a carriage on tracks 115 on either side of the die. The tracks extend outwardly to the front or to an unloading station, substantially as shown.

The tracks 115 are attached to the machine by any suitable means such as the cross beams 116 on brackets 117 secured to the press bed 28. To remove a molded piece from the upper platen, the device with a pallet in place is moved inward on the tracks 115 until the pallet is directly beneath the molded piece, this position being determined by track abutments 118. The trigger 110 is then pulled back until the pallet just touches the bottom of the molded piece. The fluid pressure is then turned on to strip the piece from the platen. The tension of the springs 94 is so selected that the upper frame 92 will not yield substantially until the entire weight of the molded piece is upon it. Consequently, there is no danger that the piece 51A will be distorted while it is being stripped from the upper platen.

When the piece has thus been stripped, the pallet drops a short distance with the molded piece on it free of the platen and the carriage is rolled outward to the unloading station. The pallet and piece thereon is then picked up and transferred for further processing, such as to a kiln. It is replaced with a fresh pallet and the procedure repeated.

I claim:

1. The method of molding soft, frangible materials, comprising placing the material in one part of a two part die, bringing the two parts of the die together in vertical alignment under pressure in an enclosure to conform the material therebetween to the shape defined by the interior walls of the die, moving both parts of the die simultaneously and independently of each other with the molded piece therebetween out of the enclosure to an unloading station, releasing and removing the lower die part from the molded piece while retaining and supporting the molded piece on the other die part, substituting a pallet for the removed die part, and then releasing the other die part from the molded piece.

2. The method of molding soft, frangible material, comprising placing the material in one part of a two part die disposed so that one die part is at the bottom and the other die part at the top, bringing the two die parts together under pressure in an enclosure to conform the material therebetween to the shape defined by the interior walls of the die and enclosure, moving both die parts simultaneously and independently of each other with the molded piece therebetween out of the enclosure to an unloading station, releasing and removing the bottom die part from the formed piece while retaining and supporting the said piece by the upper die part, substituting a pallet for the bottom die part, and then releasing the upper die part from the molded material and supporting the molded material solely by the pallet.

3. The method of molding soft, frangible materials, comprising placing the materials in one part of a two part die, bringing the two parts of the die together in vertical alignment under pressure in an enclosure to conform the material therebetween to the shape defined by the interior walls of the die, moving both parts of the die simultaneously and independently of each other with the molded piece therebetween out of the enclosure to an unloading station, releasing and removing the lower die part from the molded piece while retaining and supporting the molded piece on the other die part, substituting a resiliently supported pallet for the removed die part, and then releasing the molded piece from the other die part.

4. The method of molding soft, frangible materials, comprising placing the material in one part of a two part die, bringing the two parts of the die together in vertical alignment under pressure in an enclosure to conform the material therebetween to the shape defined by the interior walls of the die, moving both parts of the die simultaneously and independently of each other with the molded piece therebetween out of the enclosure to an unloading station, releasing and removing the lower die part from the molded piece while retaining and supporting the molded piece on the other die part, releasing the other die part from the molded piece, employing automatic operating means for performing the steps defined in the order stated, and finally, substituting a conveyor pallet for the lower die part before the molded piece is released from the upper die part.

5. In a machine for molding and conveyor pallet-loading soft frangible materials, a two part die which is operable one above the other within an enclosure, means for depositing material between said die parts and within said enclosure, means for causing movement of each of the die parts to shape the material therebetween, means for moving both die parts with a molded piece out of the enclosure to an unloading station, means for releasing and unloading the lower die part from the molded piece and substituting a resiliently supported conveyor pallet therefor, and means for releasing the other die part from the molded piece to permit said piece to rest upon the conveyor pallet.

6. A molding machine as defined by claim 5 in which the means for resiliently supporting a pallet comprises a base member, a pair of frame members carried by the base member, one above the other, resiliently yieldable means between said frame members, and means for moving the lower frame member in a vertical direction relative to the base member.

7. A molding machine as defined by claim 6 and means for supporting the base member on the machine and for moving it in and out of position between the platens.

8. A molding machine as defined by claim 7 in which the means for supporting the base member on the machine comprises a pair of tracks attached to the machine and wheels on the base member engaging said tracks.

References Cited in the file of this patent

UNITED STATES PATENTS 374,938     Carman _____ Dec. 20, 1887

(Other references on following page)

UNITED STATES PATENTS

| | | |
|---|---|---|
| 397,730 | Koch | Feb. 12, 1889 |
| 576,239 | Tempest | Feb. 2, 1897 |
| 662,674 | Koch | Nov. 27, 1900 |
| 753,377 | Dow | Mar. 1, 1904 |
| 1,592,536 | O'Neill | July 13, 1926 |
| 2,026,940 | Hendryx | Jan. 7, 1936 |
| 2,256,798 | Yeakel | Sept. 23, 1941 |
| 2,345,112 | Grundel | Mar. 28, 1944 |
| 2,449,515 | Seelig | Sept. 14, 1948 |
| 2,489,069 | Adams | Nov. 22, 1949 |
| 2,519,994 | Beyersdorfer | Aug. 22, 1950 |
| 2,632,227 | Steele et al. | Mar. 24, 1953 |
| 2,638,654 | Jordan | May 19, 1953 |
| 2,763,202 | Gramelspacher | Sept. 18, 1956 |

FOREIGN PATENTS

| | | |
|---|---|---|
| 516,031 | Germany | Jan. 16, 1931 |